March 3, 1970      G. D. MILLER      3,498,266

PSYCHOSONIC DOG TRAINING DEVICE AND METHOD OF USING SAME

Filed April 18, 1968

INVENTOR:
GENE DARE MILLER
BY
*Elliott & Pastoriza*
ATTORNEYS

United States Patent Office 3,498,266
Patented Mar. 3, 1970

3,498,266
PSYCHOSONIC DOG TRAINING DEVICE AND
METHOD OF USING SAME
Gene Dare Miller, 11927 Montana Ave.,
Los Angeles, Calif. 90049
Filed Apr. 18, 1968, Ser. No. 722,315
Int. Cl. A01k 29/00
U.S. Cl. 119—29                    12 Claims

ABSTRACT OF THE DISCLOSURE

A dog training device comprising an assemblage of metallic members including a closely linked endless loop chain is provided, the device emitting a sound spectrum upon being jingled or upon impact when tossed having maximum or peak values at frequencies slightly above the upper hearing limit of the dog. In addition to the chain links themselves forming the device, there is included a metallic frame shaped to define a tuning fork structure and various rings of metal loosely coupled to the chain in such a manner that the frequency sound spectrum peaks at the desired values of frequency to stimulate the dog on a subliminal psychosomatic level when the device is thrown or tossed or jingled in the hands. The method of training is primarily directed towards training a dog against the doing of undesirable acts and includes the steps of tossing the device close to the dog at the moment of the starting or doing of the undesirable act so that the dog effects mentally a counter association against his act as opposed to any connection between the person tossing the device and the act. Immediate praise is given upon the dog's resulting response provided it is a desirable one. Praise reinforces the desirable response making it permanent.

---

This invention relates generally to the conditioning or training of dogs and more particularly to an improved dog training device and method of using the same over that described and claimed in my prior United States Patent 3,159,140 issued Dec. 1, 1964.

BACKGROUND OF THE INVENTION

In my above referred to prior United States patent, there is described a training collar for a dog in the form of a chain comprised of small closed links of hard metal to provide high frequency sound waves above the normal audio range when struck or jingled, It is well known that dogs are responsive to high frequency sound waves generally above the normal human audio range and advantage was taken of this fact to effect associations between the sounds emitted by the chain collar and positive words spoken by a trainer in order to train the dog to perform desirable acts. In this respect, my referred to patent describes a training method wherein a desired association is effected between a word spoken by the trainer and a desired act to be performed by the dog. This association is accomplished by causing the high frequency sound to be emitted by the collar or chain structure simultaneously with a spoken word and then subsequently speaking the word without emitting any high frequency sound. The word is then spoken a third time while simultaneously emitting the high frequency sound and this alternate procedure is repeated until the dog will respond to the word without the benefit of the sound.

Since the issuance of the above-mentioned patent, I have performed considerably further research with respect to the training of dogs by means of sound association and in this further work, I have discovered that extremely effective results occur if the emitted sound energy occurs at a frequency slightly above the highest hearing range of the dog. At this level, the sound is subliminal in nature insofar as the dog is concerned. Thus, such sound energy, while not physically audible to the dog, nevertheless causes an association to take place in the dog's mind with whatever accompanies the subliminal sound stimulus. It is important to give instant physical and verbal praise recognition to the resulting observed desirable response that the dog makes. This instantly required praise is known as positive learning reenforcement. There results a substantially permanent association all to the end that the training of dogs can be extended to a substantially greater range than heretofore deemed possible without physical force or pain stimuli. Dogs trained in accord with the present invention learn willingly and associate directly with objects or act thereby achieving faster and far more than dogs trained by previous indirect methods in which learning is accomplished through the avoidance of pain stimulus.

More particularly, I have devised methods of training a dog against the doing of undesirable acts in such a manner that the dog is trained relative to the act alone without any association with the trainer himself but rather wholly as a consequence of the use of an improved sound emitting device. A great advantage results in that the learning association (actually a counter association) remains in a lasting manner with the undesirable act or object itself and not with the trainer or owner himself. When a person punishes a dog, he causes a learning association to relate mainly to himself rather than to the undesirable object or act. Therefore when the person leaves, the dog feels free to return to his mischief.

BRIEF SUMMARY OF THE INVENTION

In accord with the present invention, a device similar in many respects to the collar chain structure of my prior patent is provided and takes the form of an assemblage of metallic intercoupled members or elements adapted to be manually jingled or thrown as a collector to cause jingling thereof upon impact. This assemblage is engineered to emit a sound frequency spectrum having at least one peak value at a frequency slightly higher than the highest audio frequencies the dog can hear. As a result, a painless learning association at a subliminal level is evoked in the dog when the sound frequency spectrum is emitted.

The method or training technique in accordance with the present invention extends beyond the method defined in my prior patent. The expanded method contemplates the training of a dog against the doing of undesirable acts and comprises the steps of tossing the device capable of emitting a sound frequency upon impact slightly higher than the upper range of hearing of the dog, close to the dog such that impact of the device will occur at substantially the moment that the dog is starting or doing an undesirable act. The dog's own "startle-back" is quite permanently impressed on his memory centers to the end that when the dog himself tries to repeat the undesirable act this "startle-back" tends to be repeated independently of the dog's will in an automatic manner.

The speaking of any words on the part of the trainer or person at the time of tossing the device is strictly avoided such that the only sound to which the dog is responsive is that resulting from the device. The dog, as a consequence, effects a mental connection between the sound emitter by the device and his starting or doing his act as opposed to any connection between the person tossing the device and the act. If necessary, the tossing step is repeated until the dog avoids the doing of the particular act in question. Whenever the dog completes his avoidance or "startle-back," the owner then will strengthen this desirable response by immediate praise.

DETAILED DESCRIPTION

Figure 1:
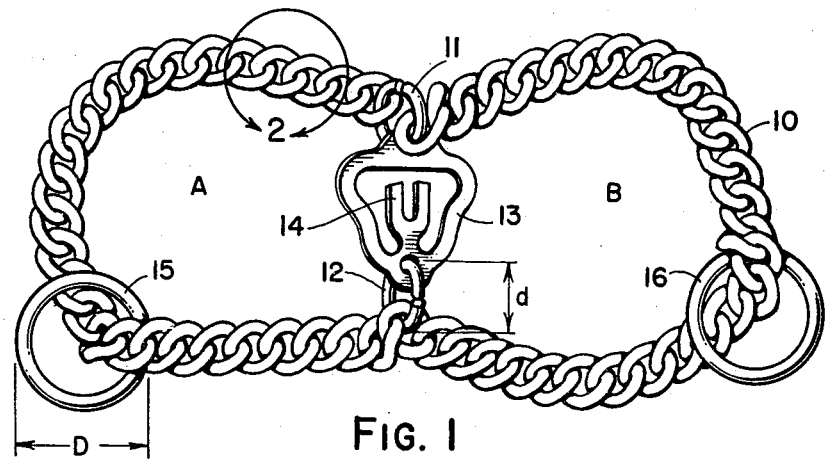
FIGURE 1 is a perspective view of my improved dog training device in accord with the present invention.

Referring first to FIGURE 1, there is shown an assemblage of metallic members preferably in the form of a chain 10 made of closely coupled links of hard metal such as phosphor bronze. As shown, the chain is closed on itself to define a large endless loop.

First and second split metallic rings 11 and 12 encircle closed links of the chain 10 at substantially diametrically opposite points of the closed loop and serve to secure therebetween a metallic frame 13. Frame 13 includes a portion defining a tuning fork structure 14.

The interconnecting frame 13 with the rings 11 and 12 essentially divides the chain 10 into two loops designated generally A and B. The assemblage is completed by closed rings of metal 15 and 16 surrounding portions of the chain to be captured thereby in respective loops A and B. The diameter of each of the rings 15 and 16 is substantially twice the diameter of the smaller rings 11 and 12.

The elements described above making up the training device of this invention are engineered to emit a sound frequency spectrum upon jingling of the device or upon impact when the device is thrown, which peaks to maximum values at certain frequencies preferably slightly greater than thirty-four kilocycles per second. Other peak points in the sound frequency spectrum also result from the preferred arrangement described in FIGURE 1.

Figure 2:
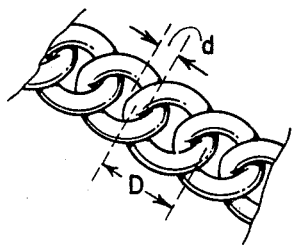
FIGURE 2 is a fragmentary enlarged view of the portion of the device in the circular arrow 2 of FIGURE 1.

FIGURE 2 shows a detail of the chain wherein each link has a thickness $d$ and mean diameter $D$. The ratio of $d/D$ is between .1 and .3 to provide the desired close linkage.

Figure 3:
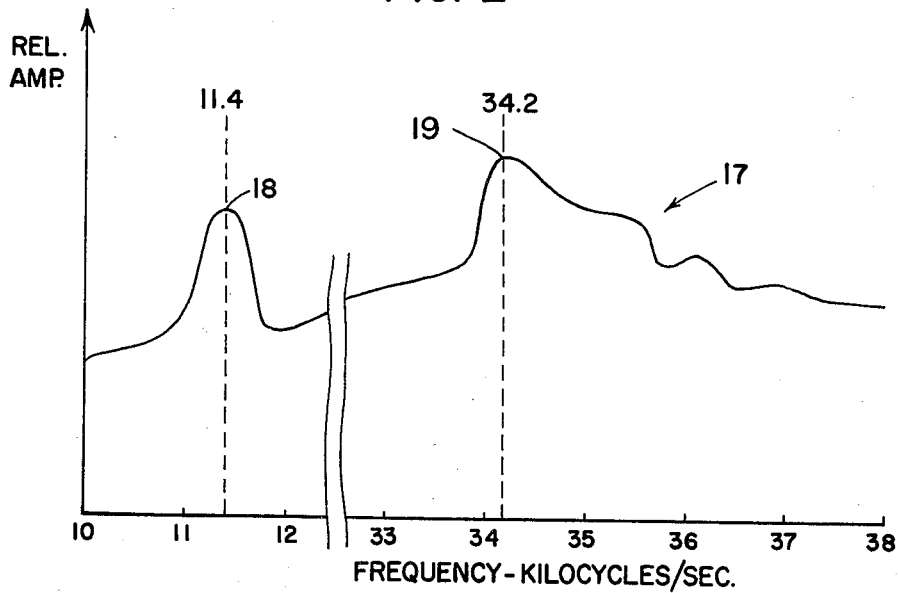
FIGURE 3 is a sound frequency spectrum useful in explaining the operation of the device of FIGURE 1 and the improved method of training in accord with the present invention.

FIGURE 3 illustrates at 17 a sound frequency spectrum for the particular device of FIGURE 1. In the preferred embodiment, it will be noted that there is a peaking of the sound spectrum frequency at the point 18 corresponding to approximately 11.4 kilocycles per second. This peaking results from the tuning fork structure 14 of FIGURE 1.

At the higher end of the frequency spectrum, there is a peaking in the area of 34.2 kilocycles per second as indicated at 19. This portion of the spectrum is contributed by the chain 10 of FIGURE 1 and this desired sound emission would result using simply this particular chain without the other elements. Peaking at this portion of the spectrum is also provided by the rings 15 and 16; that is, the resonant frequency of the rings is engineered to correspond to substantially 34.2 kilocycles per second.

Finally, the smaller rings 11 and 12 of FIGURE 1 peak at the area 19. The split in these rings results in this resonnant frequence of 34.2 kilocycles even though the rings are smaller than the larger rings 15 and 16 which latter rings are fused into closed loops.

OPERATION

It has been established by scientific research that the average upper audio limit of a dog's conscious hearing is approximately thirty-four kilocycles per second. The operation of the training device is such that the frequency spectrum peaks slightly above this highest point of a dog's conscious hearing as described in conjunction with FIGURE 2. As a consequence, the emitted sound is subliminal in nature and while the dog cannot consciously hear the emitted sounds that are higher than approximately thirty-four kilocycles, the presence of this higher frequency sound evokes a desirable learing response in the dog's mental processes. This subliminal sound stimulus opens the dog's conscious mind willingly to accept whatever thought accompanies it. Instant praise-recognition is given upon the dog's desirable response.

Advantage is taken of this subliminal association phenomenon for training the dog on a more preferred neutral plane rather than painful or physical and in this respect, the device can be used in two ways.

First, the device is useful for training the dog to perform positive acts and for training the dog to respond to the spoken voice. The method involved is substantially that described in my heretofore referred to United States patent except that this device is entirely leashless.

Second, and in accord with the method of the present invention, the training is expanded to the extent that a dog can be trained against the doing of certain undesirable acts. This is accomplished by tossing the device away from the trainer and towards the dog to land closely to the dog so that the sound is emitted upon impact. The tossing takes place at the precise moment that the dog is about to start an undesirable act; for example, attacking an object such as shoes or furniture or, a purely personal type undesirable act wholly on the part of the dog such as unwarranted barking, general unruliness, and the like.

In the second training method, the chain structure described in FIGURE 1 is tossed close to an object at the moment the dog appears ready to start to attack the object. It is vitally important that the trainer or person tossing the chain does not speak or utter any sound himself. When the device strikes the object or the floor close to the dog, the frequency sound spectrum described in FIGURE 2 is emitted and the dog will immediately stop, the distraction as a consequence of the subliminal frequency causing a discontinuity or counter-association in the mental processes of the dog which relates to the object alone resulting in lasting effectiveness, even in the owner's absence.

With respect to the foregoing, it is important to note that since the device emits its sound close to the object being attacked; that is, close to the dog, a counter-association between the sound and the particular object or act involved is created in the dog's mind as opposed to creating any counter-association between the owner or person tossing the device and the act. This is very important since it is desirable to associate with the owner positive or desirable acts and to disassociate from the owner undesirable acts. Thereby causing said correction to remain effective even in the owner's absence since its association related to the unwanted act or object only.

The foregoing process of tossing the device close to the dog at the start of or at the time of an undesirable act, is repeated and it has been found that at least four distinct tossings in widely separated areas are necessary to effect a permanent counter-association in the dog's mind so that the dog will avoid the object or avoid performing the undesirable act. In this respect the dog learns a principle rather than relating to a specific environment. Thus each of the four times that the tossing takes place must be done in a different environmental location. In the preferred operation or use of the device and in accord with the improved method, the best results are attained when at least four tosses are made in different environments. Of course, if the particular object which it is desired to have the dog avoid is a permanent object such as a piece of furniture, the tossing can only be effected in the one location. However, such is sufficient to form the desired counter-association in the dog's mind with respect to that particular piece of furniture.

While the expanded method of training has been directed primarily towards the conditioning of dogs against the doing of undesirable acts, it should be understood, of course, that the improved device of the present invention could be employed in the method as heretofore set forth in my already issued patent and with the greatly added advantage that this device is entirely leashless and thus free of the physical limitations of a leash. This is important since it is well known that dogs trained only on a leash tend not to obey as well when the leash is off as when on. In this manner effective control of the dog at a distance is achieved.

What is claimed is:

1. A device for training dogs comprising: an assemblage of metallic, loosely coupled, members adapted to be manually jingled together or thrown as a collection to cause jingling thereof upon impact, said assemblage including a means when actuated for emitting a sound frequency spectrum having at least one peak value at a frequency slightly higher than the highest audio frequency said dog can hear, whereby a subliminal response is evoked in said dog when said sound frequency spectrum is emitted.

2. A throw chain for training dogs comprising: a plurality of closely joined metallic chain links closed on itself to form an endless loop so that no free ends result which might harm a dog, said chain having a means for producing a mechanical resonant sound frequency spectrum when jingled, or upon impact when thrown, which peaks to maximum value at a frequency slightly greater than thirty-four kilocycles per second.

3. A throw chain according to claim 2, in which the ratio of the thickness to mean diameter of each link of said chain is between .1 and .3.

4. A chain according to claim 2, including first and second split metallic rings looped through first and second chain links at substantially diametrically opposite portions of said endlless loop; and a closed metallic frame coupled to said first and second rings to divided said chain into two closed loops, a portion of said frame being shaped to define a tunning fork structure having a resonant frequency approximately one-third that of the peak frequency emitted by said chain.

5. A chain according to claim 4, including at least one additional ring of metal of diameter approximately twice that of either of said split metallic rings, said additional ring encircling a portion of said chain defining one of said closed loops so that it is captured thereby but is free to slide along the links thereof, and strike said tunning fork structure, said additional ring having a resonant frequency at substantially 34.2 kilocycles per second.

6. A chain according to claim 5, including yet another ring of metal of diameter twice that of either of said split metallic rings encircling a portion of said chain defining the other of said closed loops and having a resonant frequency at substantially 34.2 kilocycles per second.

7. A chain according to claim 4, in which said frequency at which said sound frequency spectrum peaks is substantially 34.2 kilocycles per second, said resonant frequency of said tuning fork structure being 11.4 kilocycles per second, and said first and second metallic rings emitting sound frequencies of 34.2 kilocycles per second for the planned purpose of achieving a stimulus to the subliminal area of the dog's mind.

8. A method of training a dog against the doing of undesirable acts comprising the steps of: tossing a device capable of emitting a sound frequency upon impact slightly higher than the upper range of hearing of said dog, close to the dog such that impact will occur at substantially the moment that the dog is starting or doing an undesirable act, and avoiding the speaking of any words such that the only sound to which the dog is responsive is that resulting from said device and the dog effects a mental counterassociation between the sound emitted by the device and his act as opposed to any connection between the person tossing the device and said act; and repeating said tossing step until said dog avoids the doing of said act even in the owner's absence.

9. The method of claim 8, including the step of immediately praising said dog only after the emitting of said sound frequency causing the subsequent avoidance of the undesirable act by the dog.

10. The method of calim 8, in which said tossing step is repeated at least four times, each time taking place at a different environmental location.

11. The method of claim 8, in which said act constitutes attacking an object and in which said device is tossed at the object at the moment the dog is about to attack the object so that the dog learns to leave the object alone, even in the owner's absence.

12. The method of claim 8, in which said act constitutes a personal act solely on the part of the dog and in which said device is tossed at the feet of the dog thereby inhibiting the personal act itself independent of the owner's presence and without the need for the usual constant and oft repeated verbal admonishments.

References Cited

UNITED STATES PATENTS 3,311,088   3/1967   Peterlin _____ 119—106 X

ADRICH F. MEDBERY, Primary Examiner

U.S. Cl. X.R.

119—106